United States Patent [19]
Hoogerwerf et al.

[11] Patent Number: 5,893,031
[45] Date of Patent: Apr. 6, 1999

[54] SYSTEM AND METHOD FOR COLLECTION OF TRANSMISSION CHARACTERISTICS

[75] Inventors: David N. Hoogerwerf, Everett; David M. Stanhope, Tacoma, both of Wash.

[73] Assignee: Cellular Technical Services Company, Inc., Seattle, Wash.

[21] Appl. No.: 670,512

[22] Filed: Jun. 27, 1996

[51] Int. Cl.$^6$ ...................................... H04Q 7/20
[52] U.S. Cl. .......................... 455/410; 455/411; 455/67.2
[58] Field of Search ................................... 455/410, 411, 455/425, 115, 575, 90, 572, 67.2; 375/200

[56] References Cited

U.S. PATENT DOCUMENTS

| | | | |
|---|---|---|---|
| 3,120,641 | 2/1964 | Buckley | 325/67 |
| 3,273,150 | 9/1966 | Emerson | 343/18 |
| 3,308,463 | 3/1967 | Emerson | 343/18 |
| 3,365,667 | 1/1968 | Deutsch et al. | 325/67 |
| 3,662,389 | 5/1972 | Coffin et al. | 343/100 AP |
| 3,913,013 | 10/1975 | Barley et al. | 324/77 B |
| 4,232,319 | 11/1980 | Fusinski | 343/703 |
| 4,249,257 | 2/1981 | Campbell | 455/115 |
| 4,305,153 | 12/1981 | King | 455/67 |
| 4,797,931 | 1/1989 | Furukawa et al. | 351/56 |
| 4,800,387 | 1/1989 | Joy | 455/67.2 |

(List continued on next page.)

FOREIGN PATENT DOCUMENTS 2 232 850   12/1990   United Kingdom .

OTHER PUBLICATIONS

Bergmann et al., "Protocol Conformance Testing of a GSM Mobile Station," *MRC Mobile Radio Conference,* Nice, France, 13–15 Nov. 1991, pp. 17–24.

Kall, J., "The GSM System Simulator," *Conference Proceedings on Area Communication,* Stockholm, Sweden, Jun. 13–17, 1988, pp. 478–481.

Ehrlich et al., "Automotive Environments and Testing for Cellular Mobile Telephones," *35$^{th}$ IEEE Vehicular Technology Conference,* Boulder, Colorado, May 21–23, 1985, pp. 165–169.

Komata et al., "Automatic Measurement for Mobile Radio Unit," *Review of the Electrical Communication Laboratories,* vol. 30,(2):380–391, 1982.

*Primary Examiner*—Edward F. Urban
*Assistant Examiner*—Seid Raju
*Attorney, Agent, or Firm*—Seed & Berry, LLP

[57] ABSTRACT

A system and method for collecting fingerprint reference wave forms under controlled conditions includes a radio frequency (RF) enclosure designed to receive a cellular telephone. A control system, including a transmitter and receiver provides RF communications with a cellular phone placed in the enclosure. A processor controls operation of the transmitter and receiver. The processor sends commands to the cellular phone in the enclosure using the transmitter. The transmitted commands are selected to elicit a RF transmission from the cellular phone in response to the command. The receiver detects the response from the cellular telephone and generates a reference wave form indicative of the transmission characteristics of the transmitter of the cellular phone in the enclosure. The processor captures one or more reference waveforms that can be used to generate a fingerprint indicative of a transmission characteristic of the transmitter of the cellular telephone. In addition, the system can include an external power supply and temperature control system to vary the voltage level of power supplied to the cellular telephone in the enclosure and to vary the temperature in the enclosure. By varying the operating voltage and temperature, the processor can collect reference waveforms under a variety of operating conditions. In addition, the processor can select the carrier frequency for the cellular telephone and for the transmitter and receiver of the control system. Furthermore, the processor can vary the transmit power of the system transmitter and the transmit power of the transmitter within the cellular telephone itself. The system is sized to be readily moved from one location to another to permit the simple collection of reference waveforms under a variety of controlled conditions.

39 Claims, 6 Drawing Sheets

U.S. PATENT DOCUMENTS

| | | | |
|---|---|---|---|
| 4,816,767 | 3/1989 | Cannon et al. | 324/58 |
| 4,843,562 | 6/1989 | Kenyon et al. | 364/487 |
| 4,864,315 | 9/1989 | Mohuchy | 343/703 |
| 4,950,999 | 8/1990 | Agnello et al. | 324/77 |
| 4,955,049 | 9/1990 | Ghisler | 379/58 |
| 4,968,983 | 11/1990 | Maeda | 343/703 |
| 5,005,210 | 4/1991 | Ferrell | 455/115 |
| 5,091,942 | 2/1992 | Dent | 380/46 |
| 5,134,405 | 7/1992 | Ishihara et al. | 342/1 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,302,960 | 4/1994 | Boers | 342/372 |
| 5,303,285 | 4/1994 | Kerihuel et al. | 379/58 |
| 5,309,501 | 5/1994 | Kozik et al. | 379/58 |
| 5,315,636 | 5/1994 | Patel | 379/58 |
| 5,319,699 | 6/1994 | Kerihuel et al. | 379/58 |
| 5,329,591 | 7/1994 | Magrill | 375/200 |
| 5,335,265 | 8/1994 | Cooper et al. | 379/58 |
| 5,335,278 | 8/1994 | Matchett et al. | 380/23 |
| 5,345,595 | 9/1994 | Johnson et al. | 455/33.1 |
| 5,390,245 | 2/1995 | Dent et al. | 380/23 |
| 5,392,355 | 2/1995 | Khurana et al. | 380/23 |
| 5,392,356 | 2/1995 | Konno et al. | 380/23 |
| 5,420,908 | 5/1995 | Hodges et al. | 379/58 |
| 5,420,910 | 5/1995 | Rudokas et al. | 455/410 |
| 5,448,760 | 9/1995 | Frederick | 455/56.1 |
| 5,455,863 | 10/1995 | Brown et al. | 380/23 |
| 5,465,387 | 11/1995 | Mukherjee | 455/26.1 |
| 5,467,382 | 11/1995 | Schorman | 379/58 |
| 5,488,649 | 1/1996 | Schellinger | 379/62 |
| 5,509,075 | 4/1996 | Grube et al. | 380/23 |
| 5,517,554 | 5/1996 | Mitchell et al. | 379/59 |
| 5,517,555 | 5/1996 | Amadon et al. | 379/59 |
| 5,517,568 | 5/1996 | Grube et al. | 380/23 |
| 5,535,431 | 7/1996 | Grube et al. | 455/54.1 |
| 5,537,474 | 7/1996 | Brown et al. | 380/23 |
| 5,541,977 | 7/1996 | Hodges et al. | 379/58 |
| 5,548,636 | 8/1996 | Bannister et al. | 379/201 |
| 5,551,073 | 8/1996 | Sammarco | 455/89 |
| 5,555,192 | 9/1996 | Grube et al. | 364/514 R |
| 5,555,551 | 9/1996 | Rudokas et al. | 379/59 |
| 5,625,869 | 4/1997 | Nagamatsu et al. | 455/33.1 |
| 5,633,914 | 5/1997 | Rosa | 379/59 |
| 5,655,004 | 8/1997 | Holbrook | 455/411 |
| 5,715,518 | 2/1998 | Barrere et al. | 455/411 |
| 5,748,722 | 5/1998 | Lee | 379/160 |
| 5,770,846 | 6/1998 | Mos et al. | 1235/440 |

SYSTEM AND METHOD FOR COLLECTION OF TRANSMISSION CHARACTERISTICS

TECHNICAL FIELD

The present invention relates generally to cellular telephone transmission characteristics, and, more particularly, to a system and method for the collection of transmission characteristics.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each transmitter. When an individual subscriber or other authorized user of a particular cellular telephone wishes to place a phone call, he dials in a telephone number and presses the "Send" button. In response, the cellular telephone transmits its ESN and MIN to the cellular network so the individual subscriber can be charged for the telephone call.

Unfortunately, unscrupulous individuals illegally operate cellular telephones by counterfeiting the ESN and MIN of a valid subscriber's telephone in order to obtain illegal access to the cellular network without paying for the service. The ESN and MIN of a cellular telephone can be obtained by a counterfeiter electronically monitoring the initial transmission of the telephone, and then programming the detected ESN and MIN into another telephone for illegal use. Thus, the mere transmission of the authentic ESN and MIN is by itself inadequate to protect a cellular telephone system from misuse by counterfeiters.

In an effort to provide additional security, some cellular systems and other wireless services, authenticate mobile units based on the radio frequency (RF) transmission of data by the mobile unit during a call set-up process. Rather than identify the mobile unit by its ESN and MIN alone, the system identifies a mobile unit by its transmission characteristics. In this manner, the cellular system operator can reject calls from illegitimate mobile units even when those mobile units transmit valid ESN and MIN numbers. For example, in U.S. Pat. No. 5,005,210 issued to Ferrell on Apr. 2, 1991 ("the Ferrell patent"), a system is described that analyzes certain transmitter characteristics in an effort to identify the transmitter type. The system in the Ferrell patent analyzes the manner in which the modulator makes a transition to the designated carrier frequency. This transient response is used to identify the type of transmitter.

While the Ferrell patent describes one class of transmission characteristics that can be used as a fingerprint, other transmission characteristics are also known in the art. For example, U.S. Pat. No. 5,420,910 issued to Rudokas et al. on May 30, 1995 ("the Rudokas patent"), describes an identifier, such as a radio frequency signature, that can be used to positively identify a valid cellular telephone or a known fraudulent telephone. Other types of signature authentication systems are also known in the art and need not be described herein. These transmission characteristics, from whatever source they are derived, can be processed in different manners to create a "fingerprint" of the individual transmitter. The analogy with fingerprints is used because each fingerprint is believed to be completely unique. The transmitter fingerprint can be used to determine whether the transmission characteristics of an unknown transmitter match the stored fingerprint of the authentic transmitter corresponding to the transmitted ESN and MIN. In such manner, the fingerprint is used with cellular telephone calls to authenticate the cellular telephone.

The fingerprint authentication systems all require at least one transmission characteristic waveform, known to be generated by the authentic cellular telephone, to be used as a reference waveform for the fingerprint authentication system. Some systems may rely on more than one reference waveforms to generate the fingerprint. One drawback of these fingerprint authentication systems is making sure that only authentic reference waveforms are included when delivering the fingerprint to be stored. The fingerprint is corrupted if it includes as reference waveforms transmission characteristics from illegal cellular telephones using the ESN and MIN of the authentic cellular telephone for which the fingerprint is being defined.

Some systems take steps to assure that the reference waveforms are from the authentic cellular telephone. For example, some cellular telephone systems monitor the telephone numbers dialed by the cellular telephone in an effort to detect a pattern of use. The commonly called telephone numbers are sometimes referred to as "valid dialed digits." In these fingerprint authentication systems, reference waveforms may be collected from the cellular telephone when it dials one of these valid dialed digits. This helps assure that it is the authentic cellular telephone generating the reference waveforms.

However, even with the assurance that the cellular telephone is authentic, the reference waveforms themselves are often collected under adverse or varying conditions thus leading to inaccurate fingerprints. For example, the signal strength of the cellular telephone transmission often varies based on the location of the cellular telephone and other factors such as the strength of the battery in the cellular telephone. Thus, the received signal, which is used as the source of the reference waveforms, may be a noisy or otherwise poor quality signal and thus provide a poor quality fingerprint. Another variable factor leading to poor quality fingerprints is the operating frequency or channel of the cellular telephone. As is known in the art, each cell in a cellular telephone network operates on a different frequency. The particular frequency or channel on which the cellular telephone is operating may also affect the quality of the fingerprint because the reference waveforms may be different at different frequencies. Furthermore, environmental factors, such as temperature of the cellular telephone, can alter the reference waveforms and thus adversely affect the fingerprint generated.

In addition to variable conditions related to the cellular telephone itself, external environmental factors may also affect the quality of the reference waveforms used to generate the fingerprint. For example, the cellular telephone transmission may be affected by other nearby transmitters, or other sources of radio frequency interference (RFI), as well as natural phenomenon such as sun spots, which may interfere with or disrupt normal radio communications.

Therefore, it can be appreciated that there is a significant need for a system and method to collect reference waveforms and formulate an authenticating fingerprint which eliminates these problems. The present invention provides this and other advantages as will be illustrated by the following description and accompanying figures.

SUMMARY OF THE INVENTION

The present invention is embodied in a system and method for the collection of transmission characteristics for the authentication of a cellular telephone transmitter. The system includes an enclosure sized to accept the cellular telephone. A transmitter and receiver capable of operating at frequencies used for cellular telephone communication are included in the system. An antenna is coupled to the transmitter and receiver and extends into the enclosure. The antenna couples radio frequencies transmitted by the transmitter to the enclosure and receives radio signals emanating from the cellular telephone when in the enclosure and couples the received radio frequencies to the receiver. The receiver generates receiver output signals representative of the received signals. A processor is included to control the transmitter and cause the transmitter to transmit signals to the enclosure to elicit a transmission response signal from the cellular telephone when in the enclosure. The processor also receives from the receiver output signals indicative of the transmission characteristic of the cellular telephone when in the enclosure and responding to the transmit signals from the transmitter.

In a preferred embodiment, the enclosure is substantially impenetrable to radio frequency signals. The processor may selectively control operational parameters for the transmitter and receiver to control transmit signals during transmission to the cellular telephone in the enclosure and to control the receiver when receiving signals from the cellular telephone. The operating parameters may include the selection of carrier frequency for the transmitter and receiver, and a selected transmission power level for the transmitter.

The receiver output signals indicative of the transmission characteristics may be processed by the processor to generate a fingerprint associated with the transmission characteristic. The processor may store the fingerprint for subsequent use in the authentication of the cellular telephone when used outside of the enclosure. Alternatively, an external computer system coupled to the processor may receive the receiver output signals and generate the fingerprint associated with the transmission characteristic. The system may further include a network connection coupling the processor and computer system.

The system may also include a temperature control system to provide a selected temperature within the enclosure. This permits the transmitter to elicit the transmission response from the cellular telephone at the selected temperature. In one embodiment, the temperature control system is coupled to and controlled by the processor such that the processor controls the temperature in the enclosure. The temperature control system may selectively vary the selected temperature such that the processor receives the receiver output signals indicative of the transmission characteristic as a function of temperature.

The system may also include a power supply to provide a selected level of electrical power to the cellular telephone when in the enclosure. In this embodiment, the cellular telephone is connectable to an external power supply. A power connector coupled to the power supply and connectable to the cellular telephone when in the enclosure provides power to the cellular telephone when in the enclosure. The power supply may be coupled to and controlled by the processor to permit the processor to control the selected level of electrical power. The power supply may selectively vary the level of electrical power to the cellular telephone when in the enclosure with the processor receiving the received output signals indicative of the transmission characteristic as a function of the selected level of electrical power.

In an alternative embodiment, the system includes a cellular telephone adapter connectable to a keypad connector on the cellular telephone. The cellular telephone adapter is capable of electrical connection to the keypad adapter of the cellular telephone when inside the enclosure. The processor can generate keypad commands for simulated user operation of the cellular telephone when inside of the enclosure. The processor provides keypad commands to the keypad using the cellular telephone adapter. In this embodiment, the keypad commands can be used in place of the transmitter to elicit the transmission response signal from the cellular telephone when in the enclosure.

DETAILED DESCRIPTION OF THE INVENTION

Figure 1:
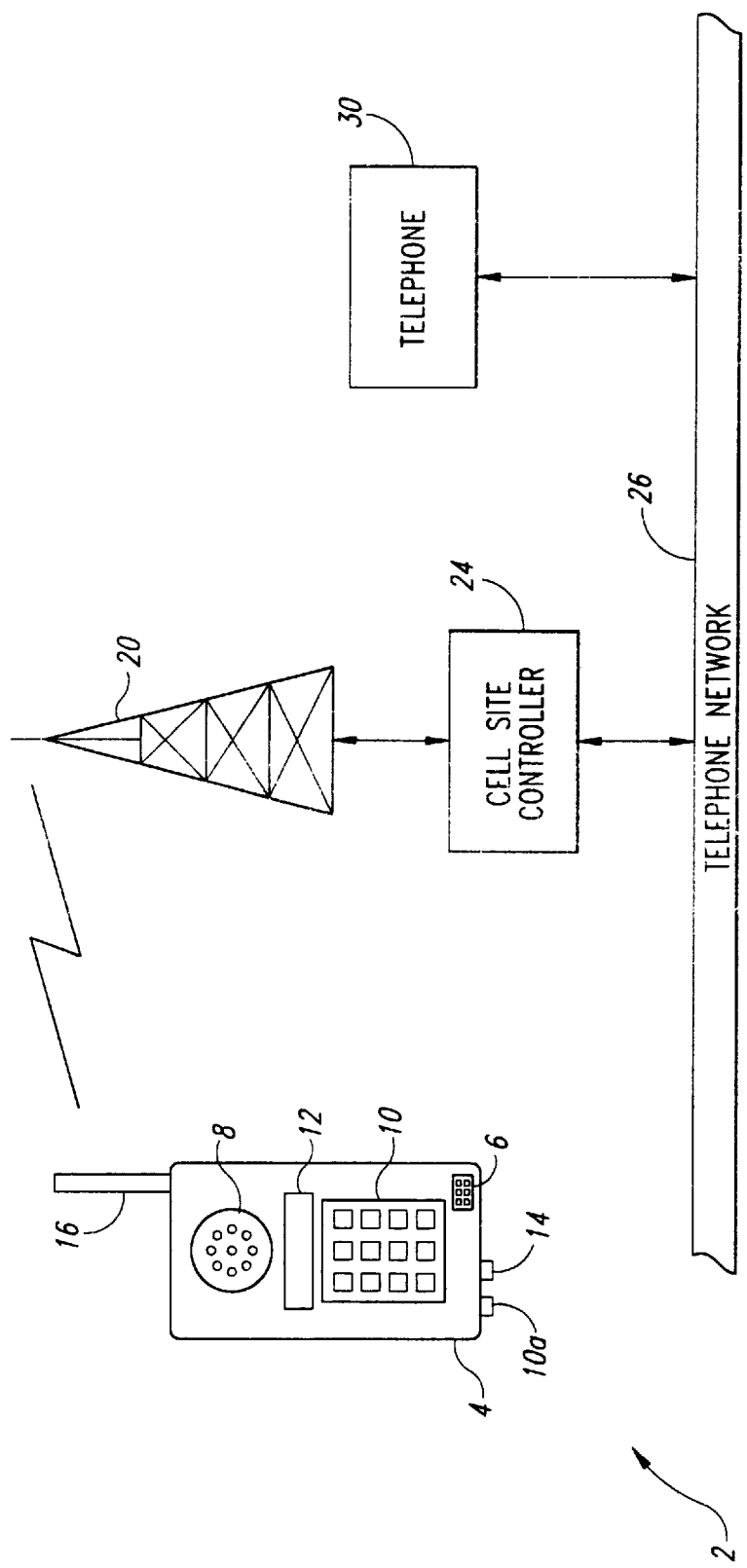
FIG. 1 illustrates the operation of a conventional cellular telephone system.

For a more complete understanding of the present invention, the operation of a conventional cellular telephone and a conventional cellular telephone network will be briefly discussed. A conventional cellular telephone system 2 is illustrated in FIG. 1. An individual cellular telephone ("cell phone") 4 has a microphone 6 and a speaker 8, as well as a keypad 10 and display 12. A connector 10*a* permits remote operation of the cell phone 4 by accepting signals in place of keypad button presses. A power supply connector 14 permits operation of the cell phone 4 with an external power supply (not shown) as would be useful for operation in an automobile.

Transmitter and receiver circuits (see FIG. 2) within the cell phone 4 communicate via an antenna 16 to a cell site antenna 20 at a frequency typically in the 800 megahertz (MHz) frequency range. The signal received by the cell site antenna 20 is coupled to a cell site controller 24. The cell site controller 24 determines the authenticity of the ESN and MIN transmitted by the cell phone 4 at the beginning of a cellular telephone call, as well as the telephone number being called by the cell phone 4. The cell site controller 24 couples the cell phone 4 to a conventional telephone network 26. Also coupled to the telephone network 26 is a telephone 30 to which the cell phone 4 is placing a call. In this manner, the cell phone 4 can communicate with the telephone 30. Similarly, the telephone 30 may place a call to the cell phone 4 in the reverse manner described above. The telephone 30 is illustrated in FIG. 1 as connected directly to the telephone network 26. However, those skilled in the art will recognize that the telephone 30 could be another cellular telephone coupled to the cell site controller 24 by the cell site antenna 20, or another cell site controller and antenna (not shown).

Figure 2:
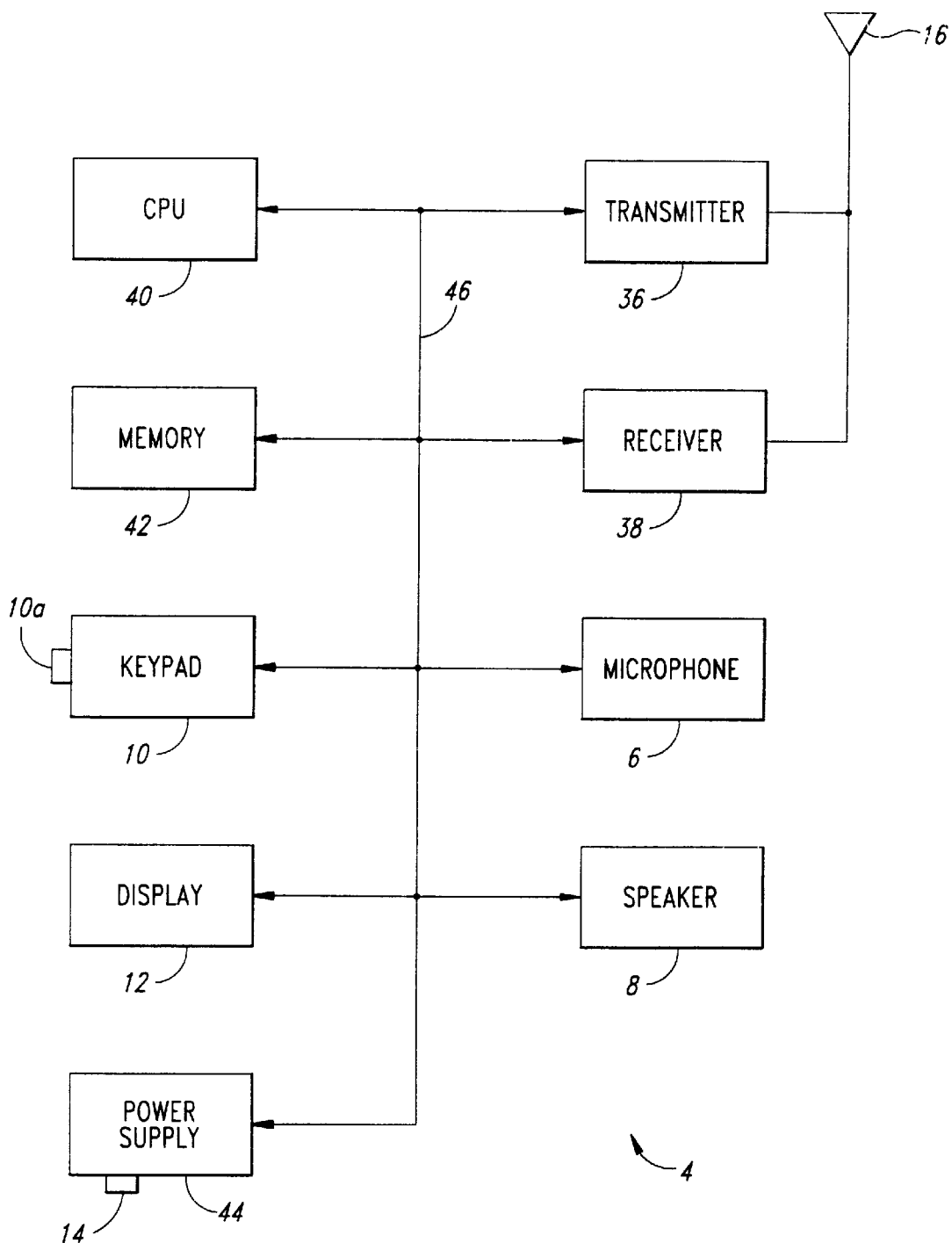
FIG. 2 is a functional block diagram of one of the conventional cellular telephones of FIG. 1.

The conventional cell phone 4 is illustrated in the functional block diagram of FIG. 2. The antenna 16 is coupled to a transmitter 36 and a receiver 38. The microphone 6, speaker 8, keypad 10, and display 12 are conventional components that need not be described in any greater detail. The cell phone 4 also includes a central processing unit (CPU) 40, which may be an embedded controller, conventional microprocessor, or the like. In addition, the cell phone 4 includes a memory 42, which may include both random access memory (RAM) and read-only memory (ROM). The cell phone 4 also includes a power supply 44, which includes a battery (not shown) for internal power and the power supply connector 14 for the supply of external power. For the sake of clarity, other conventional components, such as the modulator, demodulator, and local oscillator have been omitted. The various components described above are coupled together by a bus 46. For the sake of clarity, the bus 46 is illustrated as coupling all components together. However, those skilled in the art will recognize that some components, such as the microphone 6 and speaker 8, are analog components while the CPU 40 and memory 42 are digital components. Thus, the bus 46 represents both the analog and digital interconnection of components. The operation of the cell phone 4 is well known in the art and thus will only be described in the context of the present invention.

The cell phone 4 communicates with the cell site controller 24 (see FIG. 1) using a control channel having a predetermined frequency for the cell site and a voice channel having a frequency designated by the cell site controller 24 for the particular call being placed. Initial communications between the cell phone 4 and the cell site controller 24 occur using only the control channel. The cell phone 4 transmits the stored ESN and MIN for the cell phone to the cell site controller 24 over the control channel. In addition, the dialed telephone number is also transmitted from the cell phone 4 to the cell site controller 24 over the control channel. The control channel transmits and receives digital data using frequency-shift keying (FSK) having 5 kilohertz (kHz) and 10 kHz signals to represent the two opposite binary logic levels.

Figure 3:
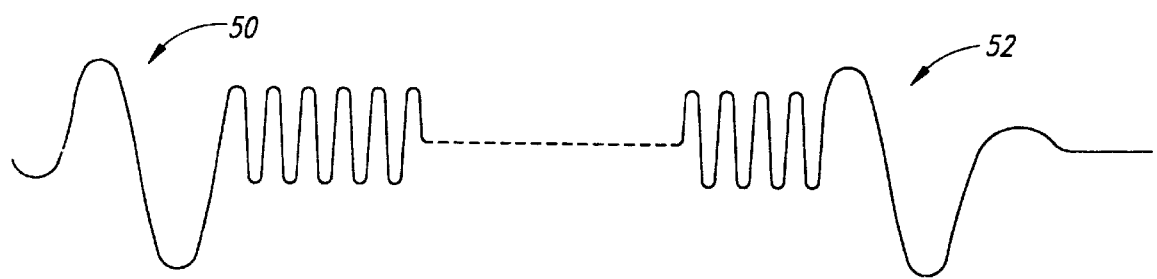
FIG. 3 is a waveform illustrating transmission characteristics of the transmitter of the cellular telephone of FIG. 2.

A typical waveform on the control channel is illustrated in FIG. 3. When the user first presses the "Send" button on the keypad 10 (see FIG. 2), the transmitter 36 FSK modulates the data at the predetermined control frequency in the 800 MHz band. When the transmitter 36 is first activated, it must lock onto the appropriate radio frequency (RF) for the particular control channel. The process of locking onto the selected control channel frequency generates a turn-on transient 50. It should be noted that the waveform illustrated in FIG. 3 is not the RF signal itself, but rather an example of the demodulated output received at the cell site controller 24. In addition to the turn-on transient 50, the cell phone 4 generates a turn-off transient 52. The turn-off transient 52 results from the turn-off transient response of the transmitter 36 (see FIG. 2) when transmission on the control channel is complete. The turn-on transient 50 and the turn-off transient 52, which are described in the Ferrell patent, are presented herein merely as examples of the transmission characteristics of an individual cell phone transmitter 36. Alternatively, the system can analyze other transmission characteristics such as the transient response of the FSK data. Other reference waveforms are illustrated in the Rudokas patent and other references. These reference waveforms, which can be from any source of reference waveforms, are used to generate the fingerprint. The fingerprint is subsequently used to determine if the cell phone 4 is authentic, or an illegal/pirate cell phone fraudulently transmitting an authentic ESN and MIN of the cell phone of a valid subscriber. The present invention is directed to the collection of reference waveforms and is not limited by the specific characteristics used as the source of the reference waveforms.

The present invention provides a novel system to collect reference waveforms under controlled environmental conditions. In addition, the system of the present invention can vary operational and external parameters in a controlled manner to verify operation of the cell telephone in a variety of conditions.

Figure 4:
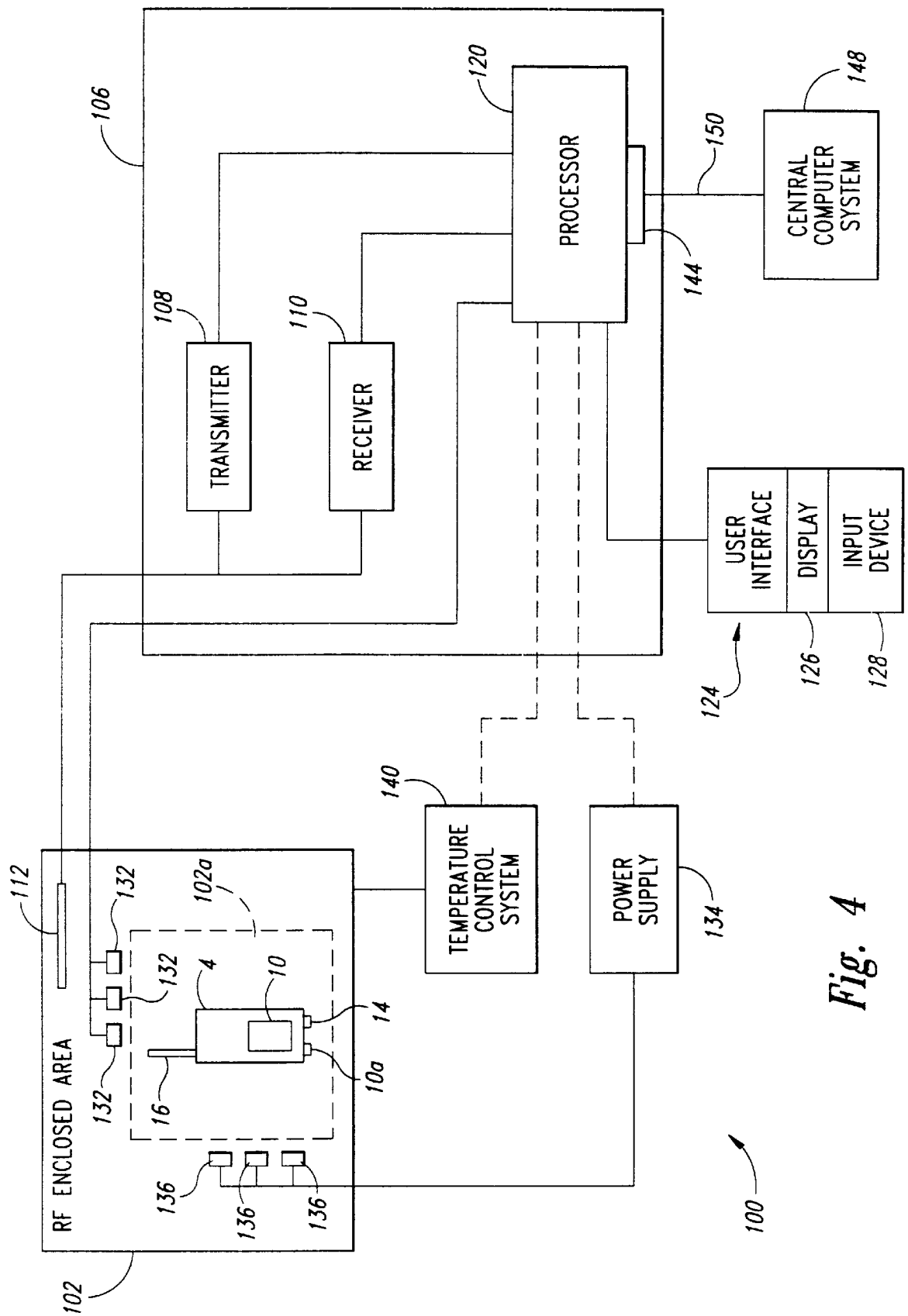
FIG. 4 is a functional block diagram of the system of the present invention.

The present invention is embodied in a system 100 shown in the functional block diagram of FIG. 4. The system includes an RF enclosure 102 having an interior portion or phone area 102a sized to receive the cell phone 4 fully therein (see FIG. 1). The RF enclosure 102 is designed to shield the phone area 102a from external RF signals in the 800 megahertz (MHz) region in which the cellular telephone system 2 (see FIG. 1) operates. The RF enclosure 102 thus provides the system 100 with a shielded area in which to test the cell phone 4 without interference from external RF sources.

The system 100 also includes a control system 106 which controls the conditions under which the reference waveforms are collected from the cell phone 4 when placed in the phone area 102a. The control system 106 includes a transmitter 108 and a receiver 110, which are both capable of operating in the range of carrier frequencies used by the cellular telephone network 2. The transmitter 108 and receiver 110 can operate at a selectable carrier frequency within the range of frequencies of the cellular telephone network 2. In addition, the power output of the transmitter 108 is selectable. The transmitter 108 and receiver 110 are both coupled to an antenna 112, which extends through the RF enclosure 102 to provide RF communication between the control system 106 and the phone area 102a. The receiver 110 receives and demodulates the RF signals received on the antenna 112, and generates a receiver output signal.

The control system 106 also includes a processor 120, which controls operation of the control system 106. The processor 120 includes the typical components of a conventional microcomputer, such as a CPU and a memory, which are omitted here for the sake of brevity. The processor 120 is coupled to the transmitter 108 and the receiver 110 to control the operation of the transmitter and receiver. For example, the processor 120 provides the transmitter 108 with data to be transmitted to the cell phone 4 in the phone area 102a. In addition, the processor 120 controls the selection of transmitter operating parameters such as the carrier frequency and transmitted power output. Similarly, the processor 120 receives the receiver output signal generated by the receiver 110. In addition, the processor 120 controls the selection of receiver parameters such as the carrier frequency.

A user interface 124 is also coupled to the processor 120. The user interface typically includes a display 126 and a user input device 128. As will be discussed in detail below, the complexity of the user interface depend on the particular features incorporated into the system 100. In a simplified and totally automated system 100, the user interface 124 may be quite simple. For example, the display 126 may simply include lights to indicate the status of the system 100. The user input device 128 may simply be a "Start" button. However, in a more complex embodiment of the system 100, the display 126 may be a conventional video display, while the user input device 128 is a keyboard or touch sensitive screen. The user input device 128 may also include a cursor control device such as a mouse or track ball operating in conjunction with the keyboard. The present invention is not limited by the particular configuration of the user interface 124.

The processor 120 is also coupled to one or more phone adapters 132 which extend into the phone area 102a. As previously discussed with respect to FIG. 2, the conventional cell phone 4 includes the connector 10a, which permits remote operation of the cell phone by accepting control signals through the connector 10a instead of physical activation of the keypad 10. The plurality of phone adapters 132 are designed to operate with a variety of cell phones 4 manufactured by different companies. In one embodiment, the processor 120 provides external operation of the keypad 10 by sending appropriate control signals through the phone adapter 132 to the connector 10a (see FIG. 2) to remotely operate the cell phone 4. In such an embodiment, the system 100 can directly elicit a transmission from the cell phone 4 without need of the transmitter 108.

The system 100 also includes a power supply 134 which provides external power to the cell phone 4 through one of a plurality of power supply adapters 136. The plurality of power supply adapters 136 are designed to operate with a variety of cell phones 4 manufactured by different companies. As is known by those of ordinary skill in the art, the cell phone 4 may be powered by an internal battery (not shown) or an external power supply connected to the power supply connector 14 of the cell phone. A selected one of the power supply adapters 136 is coupled to the power supply connector 14 (see FIG. 2) to supply external power to the cell phone 4 when placed in the phone area 102a. As will be discussed in detail below, the voltage generated by the power supply 134 may be varied to test operation of the cell phone 4 and to collect reference waveforms from the cell phone, under varying power conditions. In one embodiment, the power supply 134 is a programmable power supply, and is coupled to the processor 120. The processor 120 can set the voltage output level of the power supply 134 in a conventional manner to collect reference waveforms from the cell phone 4 under varying power conditions. The system 100 can collect reference waveforms as a function of power supply voltage to assure satisfactory authentication under a variety of operational conditions.

The system 100 also includes a temperature control system 140 to control the temperature within the phone area 102a. The temperature control system 140 is a conventional heating/cooling system whose operation need not be described in detail herein. The temperature control system 140 can vary the temperature within the phone area 102a to permit the collection of reference waveforms at one or more selected temperature levels. In one embodiment, the temperature control system 140 is coupled to the processor 120 and controlled by the processor. The system 100 can collect reference waveforms as a function of temperature to assure satisfactory authentication under a variety of environmental conditions.

The processor 120 also includes an I/O connector 144 to couple the control system 106 to a central computer system 148 via a data link 150. The data link 150 may be a hard-wire connection, dedicated telephone line, or a network connection. The present invention is not limited by the specific form of the data link 150. The central computer system 148 can be used to process the reference waveforms and develop the fingerprint. Alternatively, the control system 106 may process the reference waveforms and develop the fingerprint. In this embodiment, the central computer system 148 may store the fingerprint for subsequent use in authenticating the cell phone 4. The central computer 148 can be coupled to the cell site controller 24 (see FIG. 1) by a direct high-speed communications link (not shown) so that transmission characteristics received at the cell site controller may be compared with the fingerprint stored in the central computer system. One such system for adaptively comparing waveforms is discussed in U.S. patent application Ser. No. 08/611,429, entitled "Adaptive Waveform Matching For Use In Transmitter Identification," filed on Mar. 6 1996, which is incorporated herein by reference in its entirety.

Figure 5A:
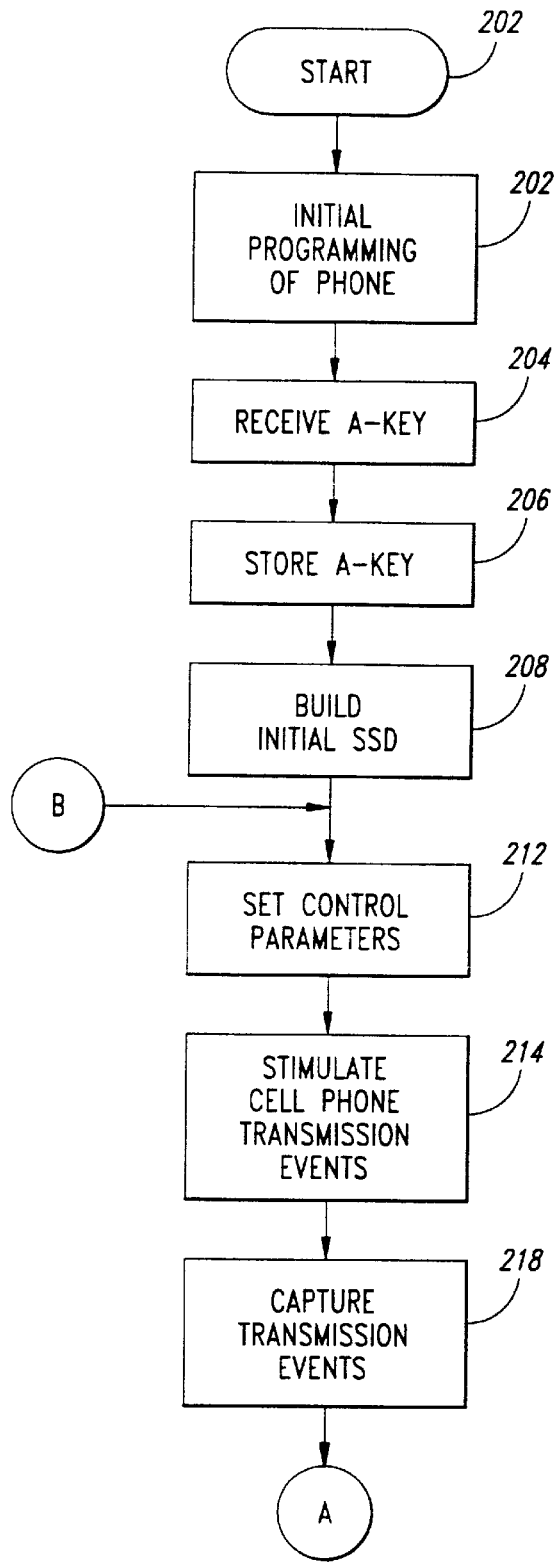
FIGS. 5A and 5B are a flowchart of the operation of the system of FIG. 4.
Figure 5B:
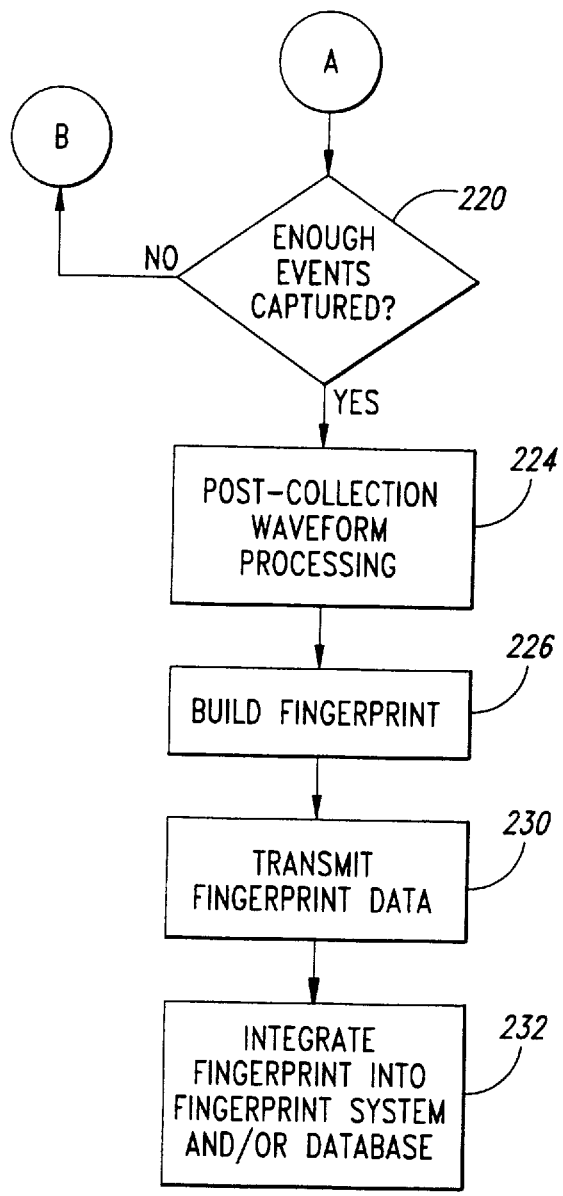

With the various system components having been briefly described, the operation of the system 100 may now be described in greater detail. The operation of the system 100 is illustrated in the flowchart of FIGS. 5A and 5B. The system 100 may typically be located in a cellular telephone retail store, manufacturing facility, or the like. At the start 200, in FIG. 5A, the cell phone 4 has been placed in the phone area 102a in the RF enclosure 102. In addition, if desired, the appropriate phone adapter 132 and power supply adapter 136 have been connected to the cell phone 4.

In step 202, the system 100 performs an initial programming of the cell phone 4. The ESN for each cellular telephone is assigned at the factory when the cellular telephone is manufactured. However, other parameters, such as the MIN, are typically programmed by the retailer at the time of sale. It should be noted that some cellular telephones are sold as prepackaged off-the shelf items. These off-the-shelf cellular telephones have been preprogrammed in what is known as a "pre-staging" procedure. If the cellular telephone has been pre-staged, step 202 may be omitted.

For cellular telephones which have not been pre-staged, the system 100 can perform the initial programming of the cell phone 4. This initial programming step may include programming of the number assignment module (NAM). As those skilled in the art can appreciate, the NAM includes assignment of the MIN, lock-out capability, A/B operating preferences, and the like. If the system 100 performs the initial programming of the cell telephone in step 202, the display 126 (see FIG. 4) is a conventional video display, while the user input device 128 is a keyboard, mouse, track ball, touch-sensitive screen, or the like.

The system 100 may also be used to program an authentication key (A-KEY) into the cell phone 4. The A-KEY is programmed into the cell phone 4 and is used in a "challenge and reply" authentication system. With the challenge and reply authentication system, the cell site controller 24 (see FIG. 1) transmits a random number to the cell phone 4 as a "challenge." It should be noted that the A-KEY itself is never transmitted by the cell site controller 24 (see FIG. 1) or the cell phone 4 in normal operation. The A-KEY is used to build a shared secret data (SSD) code, which may be transmitted from the cell site controller 24 to a different cell site controller (not shown) if the user travels with his cell phone 4 into another cellular area (i.e., operates the cell phone in the "Roam" mode). The cell site controller 24 or remote cell site controller issues the random number challenge using the SSD code.

The cell phone 4 uses the SSD code to construct a number based on the transmitted random number and transmits the constructed number to the cell site controller 24 as a "reply." The cell site controller 24 also has the A-KEY for the cell phone 4 and constructs a reference number using the SSD code and the transmitted random number. If the reply by the cell phone 4 does not match the reference number constructed by the cell site controller 24, the cell phone 4 is considered to be an unauthorized telephone.

In step 204, the system 100 receives the A-KEY from the central computer system 148 via the data link 150. To assure security of the A-KEY, the data link 150 is preferably a secure land line. In step 206, the system 100 automatically programs the A-KEY into the cell phone 4 while in the phone area 102a (see FIG. 4) using the phone adapter 132.

In prior art systems, the retail sales representative programs the NAM into the cell phone 4 at the time of sale. It is known that theft of ESN, MIN and the A-KEY by retail sales representatives is a significant source of illegally obtained codes. The system 100 provides greater security for the A-KEY and MIN because this data is never revealed to the retailer who is selling the cell phone 4.

In step 208, the system 100 builds the initial SSD code. Both the A-KEY and the SSD code are stored within the memory 42 (see FIG. 2) of the cell phone 4. It should be noted that steps 204 to 208 may be omitted if the cell phone 4 is already programmed with the A-KEY, or if the cell phone is an older design that does not have A-KEY capability.

In step 212, the control system 106 sets the control parameters for the reference waveform gathering procedure. Many of the control parameters have been previously discussed, and will not be discussed in greater detail herein. The control parameters may include the canter frequency on which the transmitter 108 and receiver 110 operate, the power level of the transmitter, and the transmission power level of the transmitter 36 (see FIG. 2) in the cell phone 4. In addition, the control system 106 can set the temperature in the phone area 102a using the temperature control system 140. Furthermore, the power supply 134 can be set to a predetermined power level to test the ability of the cell phone 4 in the phone area 102a to reproduce accurate reference waveforms under a variety of operational conditions. It should be noted that different embodiments of the system 100 may not include all components described above. For example, it is possible to collect reference waveforms without varying conditions such as electrical power, temperature, carrier frequency, transmission power, and the like. In its simplest form, the system 100 should include the enclosure 102, transmitter 108, receiver 110, processor 120, and user interface 124.

In step 214, the system 100 stimulates telephone transmission events from the cell phone 4. Preferably a sufficient number of telephone transmission events are stimulated to develop a reliable fingerprint for the cell phone 4. It is known in the art that conventional cellular telephones periodically communicate with the cell site controller 24 (see FIG. 1) even when the user is not actively engaged in a telephone call. For example, when the user moves from one cell area to another, the cellular telephone searches for a new cell site controller (not shown) and performs a registration procedure with the newly selected cell site controller. In addition, the cell site controller 24 transmits commands to the cellular telephone to select the carrier frequency for operation, to set the transmission power level, and the like. Each of these events will stimulate a transmission response by the cell phone 4, usually without the knowledge of the user. Another example of an event that stimulates a transmission event by the cell phone 4 occurs when a party places a telephone call to the cell phone 4. Before the cell phone 4 ever rings, there are transmission events that occur between the cell phone 4 and the cell site controller 24 to select the operating frequency, power level, and the like. Any event that involves sending a message to the cell phone 4 that stimulates a cellular telephone transmission is designated herein as a polling event. The present invention is not limited by the specific polling event that is used to stimulate a response from the cell phone 4.

In addition to polling events, the processor 120 can stimulate the cell phone 4 in the phone area 102a to generate a transmission by sending commands through the phone adapter 132. For example, the processor 120 can send commands to the cell phone 4 via the phone adapter 132 to cause the cell phone 4 to place a phone call. The present invention is not limited by the particular technique used to stimulate the cellular telephone transmission event.

In step 218, the system 100 captures the transmission events. For example, the receiver 110 detects the transmission event of the cell phone 4 and generates the reference waveform. The reference waveform may be the turn-on transient 50 (see FIG. 3) of the transmitter 36 (see FIG. 2) or the turn-off transient 52. Such transient response waveforms are described in the Ferrell patent. Other transmission events, such as those discussed in the Rudokas patent and others may also be detected by the receiver 110. The present invention is not limited by the specific transmission events that are used as the source of the reference waveforms.

In decision 220, shown in FIG. 5B, the system 100 determines whether a sufficient number of transmission events have been captured to develop a reliable fingerprint for the cell phone 4 in the phone area 102a. It should be noted that each transmission event can result in the capture of one or more reference waveforms. A number of different techniques that can be used to determine whether a sufficient number of transmission events have been captured. In a simple approach, the system 100 captures a fixed number of transmission events. Alternatively, the processor 120 can analyze the captured transmission events and collect a sufficient number until the variance between transmission events is below a predetermined threshold variance. In yet another alternative, the transmission events may be used by the control system 106 to progressively develop the fingerprint. The processor compares the developed fingerprint with a representative finger database to assure that the fingerprint of the cell phone 4 within the phone area 102a can be distinguished from the representative fingerprints in the fingerprint database. If the system 100 is able to distinguish the fingerprint from the cell phone 4 from the fingerprints in the database, then enough events have been captured.

As yet another alternative, the system 100 can collect a number of transmission events using different control parameters. For example, the system 100 may collect the fixed number of transmission events at several representative frequencies to determine the consistency of the transmission events as a function of carrier frequency. Similarly, the system 100 can collect a number of transmission events at other parameters, such as various temperatures, various power levels of transmission by the transmitter 108 (see FIG. 4), or the transmitter 36 (see FIG. 2) in the cell phone 4. As can readily be appreciated by those of ordinary skill in the art, the system 100 can be used to collect a large number of transmission events under very controlled conditions to determine the repeatability of the transmission events.

If enough reference waveforms have not been captured, the result of decision 220 is NO. In that case, the system 100 returns to step 212 to again set control parameters and collect additional transmission events. As discussed above, the system 100 may alter the control parameters to collect a variety of transmission events using different parameter settings for the control system 106 and the cell phone 4 in the phone area 102a.

If enough transmission events have been captured, the result of decision 220 is YES. In that case, in step 224, the system 100 performs post-processing on the transmission events. For example, the system 100 can collect a large number of transmission events and analyze each reference waveform before actually processing the reference waveforms into the fingerprint. The analysis may reveal, for example, that one reference waveform has an unacceptable high variance compared with the remaining reference waveforms. In step 224, the particular reference waveform with the high variance may be deleted before generating the fingerprint.

In step 226, the processor 120 can process the captured reference waveforms to build the fingerprint. Alternatively, the processor 120 can transmit the captured reference waveforms directly to the central computer system 148 via the data link 150 to permit the fingerprint to be constructed by the central computer system. The present invention is intended to encompass the construction of the fingerprint locally within the system controller 106 or remotely by the central computer system 148.

In step 230, the system 100 transmits the fingerprint data to the central computer system 148 for integration into a fingerprint system or a fingerprint database. As previously discussed, the transmission of fingerprint data may be the unprocessed reference waveforms, or the fingerprint itself. The process ends at step 232 with the integration of the fingerprint into a fingerprint system or database. Thus, the system 100 can collect a number of transmission events under very controlled conditions to develop an accurate fingerprint of the cell phone 4 in the phone area 102a. With the system 100, it is possible to collect transmission events under a variety of conditions and to develop an extremely accurate fingerprint. The present invention is not limited to the specific form of the fingerprint itself, but is directed to a system and method for capturing transmission events that are used to construct the fingerprint. Once a fingerprint has been generated, it can be used to authenticate future calls from the cell phone 4. When the user places a call, the cell phone 4 transmits to the cell site controller 24 (see FIG. 1). The cell site controller 24 captures the transmission event and compares it to the stored fingerprint to authenticate the cell phone 4.

It should be noted that the flowchart of FIGS. 5A and 5B illustrate one method of operation for the system 100. However, the flowchart of FIGS. 5A and 5B include many optional steps. As previously discussed, the steps 202 to 208 can be omitted if the cell phone 4 is already programmed. The system 100 can be used to collect transmission events from pre-programmed cell phones 4 as well as simplifying the initial set-up of an unprogrammed cell phone in the manner described above. In addition, the steps 224 and 226 can be performed by the processor 120 (see FIG. 4) in the control system 106 or by the central computer system 148. Those skilled in the art will understand that the sequence of steps illustrated in the flowchart of FIGS. 5A and 5B will vary depending on the particular portion of the system 100 that processes the transmission events and generates the fingerprint. For example the step 230 occurs before the step 224 and 226 if the unprocessed transmission events are transmitted to the central computer system 148 for processing. Similarly, the processor 120 may progressively build the fingerprint while capturing additional transmission events in the sequence of steps 212 to 220. In this embodiment, the steps 224 and 226 of processing and building the fingerprint occur within the above-described loop of steps 212 to 220.

The system 100 is extremely small in physical size and can be used at retail outlets to program and test the cell phone 4, and to collect authentic reference waveforms under controlled conditions. The system 100 may also be used in a mobile setting to collect reference waveforms from cell phones 4 already in use by subscribers without requiring the subscriber to bring his cell phone to a fixed location which may be inconvenient. The system 100 can be used to quickly and efficiently collect reference waveforms to generate fingerprints for cellular telephones for which no fingerprint data has been gathered or to generate a new fingerprint for cellular telephones whose fingerprint may have changed over time.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the collection of transmission characteristics for authentication of a cellular telephone transmitter of a cellular telephone, the system comprising:

an enclosure sized to accept the cellular telephone;

a transmitter capable of operating at frequencies used for cellular telephone communication;

a receiver capable of operating at frequencies used for cellular telephone communication, said receiver receiving signals from the cellular telephone when in said enclosure and generating receiver output signals representative of said received signals;

an antenna coupled to said transmitter and said receiver and extending into said enclosure, said antenna coupling radio frequencies transmitted by said transmitter to said enclosure and receiving radio frequencies emanating from the cellular telephone when in said enclosure, said antenna coupling said received radio frequencies to said receiver; and a processor to control said transmitter and cause said transmitter to transmit signals to said enclosure to elicit a transmission response signal from the cellular telephone when in said enclosure, said processor receiving from said receiver output signals indicative of a transmission characteristic of the cellular telephone when in said enclosure and responding to said transmit signals from said transmitter.

2. The system of claim 1 wherein said enclosure is substantially impenetrable to radio frequency signals.

3. The system of claim 1 wherein said processor selectively controls operational parameters of said transmitter to control said transmit signals during transmission to the cellular telephone in said enclosure and selectively controls said receiver when receiving said signals from the cellular telephone.

4. The system of claim 3 wherein said operational parameters comprise a selected carrier frequency for said transmitter and said receiver, said transmitter using said selected carrier frequency during transmission to the cellular telephone in said enclosure and said receiver using said selected carrier frequency when receiving said signals from the cellular telephone.

5. The system of claim 3 wherein said operational parameters comprise a selected transmission power level for said transmitter, said transmitter using said selected transmission power level during transmission to the cellular telephone in said enclosure.

6. The system of claim 1 wherein the cellular telephone has a selectable transmission power level and said transmitted signals to the cellular telephone when in said enclosure include signals to select a particular power level for said transmission power level, said processor receiving said receiver output signals indicative of said transmission characteristic as a function of said transmission power level.

7. The system of claim 1 wherein said processor processes said receiver output signals indicative of said transmission characteristic of the cellular telephone when in said enclosure to generate a fingerprint associated with said transmission characteristic.

8. The system of claim 7 wherein said processor stores said fingerprint for subsequent use in the authentication of the cellular telephone when used outside of said enclosure.

9. The system of claim 1, further including a computer system coupled to said processor and receiving said receiver output signals from said processor, said computer system processing said receiver output signals indicative of said transmission characteristic of the cellular telephone when in said enclosure to generate a fingerprint associated with said transmission characteristic.

10. The system of claim 9, further including a network connection, said processor being coupled to said computer system by said network connection.

11. The system of claim 9 wherein said computer system stores said fingerprint for subsequent use in the authentication of the cellular telephone when used outside of said enclosure.

12. The system of claim 1, further including a temperature control system to provide a selected temperature within said enclosure, said transmitter eliciting said transmission response from the cellular telephone at said selected temperature and said receiver receiving said signals from the cellular telephone at said selected temperature.

13. The system of claim 12 wherein said temperature control system is coupled to and controlled by said processor, said processor controlling the temperature in said enclosure by controlling said temperature controller.

14. The system of claim 12 wherein said temperature control system selectively varies said selected temperature, said processor receiving said receiver output signals indicative of said transmission characteristic as a function of temperature.

15. The system of claim 1 for use with the cellular connectable to an external power supply, the system further including:
    a power supply to provide a selected level of electrical power to the cellular telephone when in said enclosure; and
    a power connector, coupled to said power supply and connectable to the cellular telephone when in said enclosure, to provide power to the cellular telephone when in said enclosure.

16. The system of claim 15 wherein said power supply is coupled to and controlled by said processor, said processor controlling said selected level of electrical power provided to the cellular telephone in said enclosure by controlling said power supply.

17. The system of claim 16 wherein said power supply selectively varies said selected level of electrical power to the cellular telephone when in said enclosure, said processor receiving said receiver output signals indicative of said transmission characteristic as a function of said selected level of electrical power.

18. The system of claim 1 for use with the cellular telephone having a selectable operating frequency, wherein said transmit signals eliciting said transmission response signal is a command to the cellular telephone to select the operating frequency.

19. The system of claim 1 for use with the cellular telephone having a selectable transmit power level wherein transmit signals eliciting said transmission response signal is a command to the cellular telephone to select the transmit power level.

20. The system of claim 1 wherein the cellular telephone has a keypad operable by the user of the cellular telephone when used outside of said enclosure and a keypad connector for remote operation of the keypad, the system further including a cellular telephone adapter coupled to said processor and capable of electrical connection to the keypad connector of the cellular telephone when inside said enclosure, said processor generating keypad commands for simulated user operation of the cellular telephone when in said enclosure, said processor providing said keypad commands to the keypad using said cellular telephone adapter.

21. A system for the collection of transmission characteristics for authentication of a cellular telephone transmitter of a cellular telephone having a keypad operable by the user of the cellular telephone and a keypad connector for remote operation of the keypad, the system comprising:
    an enclosure sized to accept the cellular telephone;
    a receiver capable of operating at frequencies used for cellular telephone communication, said receiver receiving signals from the cellular telephone when in said enclosure and generating receiver output signals representative of said received signals;
    an antenna coupled to said receiver and extending into said enclosure, said antenna receiving radio frequencies emanating from the cellular telephone when in said enclosure and coupling said received radio frequencies to said receiver;
    a cellular telephone adapter capable of electrical connection to the keypad connector of the cellular telephone when inside said enclosure; and
    a processor generating keypad commands for simulated user operation of the cellular telephone when in said enclosure, said processor providing said keypad commands to the keypad using said cellular telephone adapter to elicit a transmission response signal from the cellular telephone when in said enclosure, said processor receiving from said receiver output signals indicative of a transmission characteristic of the cellular telephone when in said enclosure and responding to said keypad commands from said processor.

22. The system of claim 21 wherein said enclosure is substantially impenetrable to radio frequency signals.

23. The system of claim 21 wherein said processor processes said receiver output signals indicative of said transmission characteristic of the cellular telephone when in said enclosure to generate a fingerprint associated with said transmission characteristic.

24. The system of claim 23 wherein said processor stores said fingerprint for subsequent use in the authentication of the cellular telephone when used outside of said enclosure.

25. The system of claim 21, further including a computer system coupled to said processor and receiving said receiver output signals from said processor, said computer system processing said receiver output signals indicative of said transmission characteristic of the cellular telephone when in said enclosure to generate a fingerprint associated with said transmission characteristic.

26. The system of claim 21, further including a temperature control system to provide a selected temperature within said enclosure, said processor eliciting said transmission response from the cellular telephone at said selected temperature and said receiver receiving said signals from the cellular telephone at said selected temperature.

27. The system of claim 26 wherein said temperature control system is coupled to and controlled by said processor, said processor controlling the temperature in said enclosure by controlling said temperature controller.

28. The system of claim 21 for use with the cellular connectable to an external power supply, the system further including:
   a power supply to provide a selected level of electrical power to the cellular telephone when in said enclosure; and
   a power connector, coupled to said power supply and connectable to the cellular telephone when in said enclosure, to provide power to the cellular telephone when in said enclosure.

29. The system of claim 28 wherein said power supply is coupled to and controlled by said processor, said processor controlling said selected level of electrical power provided to the cellular telephone in said enclosure by controlling said power supply.

30. The system of claim 21, further including a transmitter capable of operating at frequencies used for cellular telephone communication, said transmitter coupled to said antenna to transmit to the cellular telephone in said enclosure and coupled to said processor, said processor controlling said transmitter and causing said transmitter to transmit signals to said enclosure to elicit said transmission response signal from the cellular telephone when in said enclosure, said processor receiving from said receiver output signals indicative of a transmission characteristic of the cellular telephone when in said enclosure and responding to said transmit signals from said transmitter.

31. A method for the collection of transmission characteristics for authentication of a cellular telephone transmitter of a cellular telephone wherein the cellular telephone has a keypad operable by the user of the cellular telephone and a keypad connector for remote operation of the keypad, the method comprising:
   placing the cellular telephone in an enclosure sized to accept the cellular telephone;
   coupling a cellular telephone adapter to the keypad connector of the cellular telephone when inside said enclosure;
   generating keypad commands for simulated user operation of the cellular telephone when in said enclosure;
   eliciting a transmission response signal from the cellular telephone by providing said keypad commands to the keypad using said cellular telephone adapter, wherein said step of eliciting said transmission response signal is performed by said keypad commands;
   receiving said transmission response signal from the cellular telephone when in said enclosure and generating receiver output signals representative of said received transmission response signal; and
   determining from said receiver output signals a transmission characteristic of the cellular telephone when in said enclosure and responding to said step of eliciting said transmission response signal.

32. The method of claim 31 wherein said step of receiving said transmission response signal from the cellular telephone when in said enclosure uses a receiver capable of operating at frequencies used for cellular telephone communication, said receiver receiving signals from the cellular telephone when in said enclosure and generating said receiver output signals representative of said received signals.

33. The method of claim 31 wherein said enclosure is substantially impenetrable to radio frequency signals.

34. The method of claim 31, further including the step of processing said receiver output signals indicative of said transmission characteristic of the cellular telephone when in said enclosure to generate a fingerprint associated with said transmission characteristic.

35. The method of claim 34, further including the step of storing said fingerprint for subsequent use in the authentication of the cellular telephone when used outside of said enclosure.

36. The method of claim 31, further including the step of providing a selected temperature within said enclosure, said step of eliciting said transmission response eliciting said transmission response from the cellular telephone at said selected temperature and said step of receiving said signals from the cellular telephone receiving said signals from the cellular telephone at said selected temperature.

37. The method of claim 36, further including the steps of selectively varying said selected temperature, said step of determining said transmission characteristic of the cellular telephone deter-mining said transmission characteristic as a function of temperature.

38. The method of claim 31 for use with the cellular connectable to an external power supply, the method further including the step of connecting a power supply to the cellular telephone when in said enclosure to provide a selected level of electrical power to the cellular telephone.

39. The method of claim 38, further including the steps of selectively varying said selected level of electrical power, said step of determining said transmission characteristic of the cellular telephone determining said transmission characteristic as a function of electrical power.

* * * * *